US012757125B2

(12) United States Patent
Zhu et al.

(10) Patent No.: US 12,757,125 B2
(45) Date of Patent: Oct. 6, 2026

(54) POWER HEADROOM REPORT (PHR) TRIGGERING AND REPORTING FOR MULTIPLE TRANSMISSION-RECEPTION POINT (MULTI-TRP) PHYSICAL UPLINK SHARED CHANNEL (PUSCH) REPETITION OPERATION

(71) Applicant: Nokia Technologies Oy, Espoo (FI)

(72) Inventors: Qiping Zhu, Naperville, IL (US); Matha Deghel, Massy (FR); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 301 days.

(21) Appl. No.: 18/553,633

(22) PCT Filed: Mar. 18, 2022

(86) PCT No.: PCT/FI2022/050174
§ 371 (c)(1),
(2) Date: Oct. 2, 2023

(87) PCT Pub. No.: WO2022/214735
PCT Pub. Date: Oct. 13, 2022

(65) Prior Publication Data

US 2024/0205841 A1 Jun. 20, 2024

Related U.S. Application Data

(60) Provisional application No. 63/170,829, filed on Apr. 5, 2021.

(51) Int. Cl.
*H04W 52/24* (2009.01)
*H04L 5/00* (2006.01)
(Continued)

(52) U.S. Cl.
CPC ......... *H04W 52/242* (2013.01); *H04L 5/0051* (2013.01); *H04W 52/365* (2013.01); *H04W 80/02* (2013.01)

(58) Field of Classification Search
CPC .......................... H04W 52/365; H04W 52/242
See application file for complete search history.

(56) References Cited

U.S. PATENT DOCUMENTS

2020/0229104 A1 7/2020 MolavianJazi et al.
2022/0256571 A1* 8/2022 Lo ......................... H04L 1/0045

FOREIGN PATENT DOCUMENTS

EP 3567939 A1 11/2019
WO 2020/068352 A1 4/2020
WO 2020/218900 A1 10/2020

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

(Continued)

*Primary Examiner* — Tu X Nguyen
(74) *Attorney, Agent, or Firm* — Barta Jones, PLLC

(57) ABSTRACT

Systems, methods, apparatuses, and/or computer program products for power headroom report (PHR) triggering and reporting, e.g., for multiple transmission-reception point (multi-TRP) physical uplink shared channel (PUSCH) repetition operation, are provided.

5 Claims, 4 Drawing Sheets

(51) Int. Cl.
*H04W 52/36* (2009.01)
*H04W 80/02* (2009.01)

(56) References Cited

OTHER PUBLICATIONS

"3rd Generation Partnership Project; Technical Specification Group Radio Access Network; NR; Physical layer procedures for data (Release 16)", 3GPP TS 38.214, V16.5.0, Mar. 2021, pp. 1-171.

International Search Report and Written Opinion received for corresponding Patent Cooperation Treaty Application No. PCT/FI2022/050174, dated Jun. 27, 2022, 18 pages.

"Enhancements on Multi-TRP for PDCCH, PUCCH and PUSCH", 3GPP TSG RAN WG1 Meeting #104-e, R1-2100286, Agenda: 8.1.2.1, ZTE, Jan. 25-Feb. 5, 2021, 25 pages.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NR; Physical layer procedures for control (Release 16)", 3GPP TS 38.213, V16.5.0, Mar. 2021, pp. 1-183.

Extended European Search Report received for corresponding European Patent Application No. 22784200.2, dated Jan. 23, 2025, 9 pages.

"Impact of pathloss reference on PHR triggering", 3GPP TSG-RAN WG2 Meeting #102, R2-1806917, Agenda: 10.3.1.12, ASUSTek, May 21-25, 2018, 8 pages.

* cited by examiner

```
PHR-Config ::=                          SEQUENCE {
    phr-PeriodicTimer                       ENUMERATED {sf10, sf20, sf50, sf100, sf200,sf500, sf1000,
infinity},
    phr-ProhibitTimer                       ENUMERATED {sf0, sf10, sf20, sf50, sf100,sf200, sf500, sf1000},
    phr-Tx-PowerFactorChange                ENUMERATED {dB1, dB3, dB6, infinity},
    multiplePHR                             BOOLEAN,
    dummy                                   BOOLEAN,
    phr-Type2OtherCell                      BOOLEAN,
    phr-ModeOtherCC                         ENUMERATED {real, virtual},
```

POWER HEADROOM REPORT (PHR) TRIGGERING AND REPORTING FOR MULTIPLE TRANSMISSION-RECEPTION POINT (MULTI-TRP) PHYSICAL UPLINK SHARED CHANNEL (PUSCH) REPETITION OPERATION

RELATED APPLICATION

This application was originally filed as PCT Application No. PCT/FI2022/050174 on 18 Mar. 2022, which claims priority from U.S. provisional Application No. 63/170,829, filed on 5 Apr. 2021, each of which is incorporated herein by reference in its entirety.

CROSS-REFERENCE TO RELATED APPLICATIONS

This application claims priority from U.S. provisional patent application No. 63/170,829 filed on Apr. 5, 2021. The entire contents of this earlier filed application are hereby incorporated by reference in their entirety.

FIELD

Some example embodiments may generally relate to wireless technologies including mobile or wireless telecommunication systems, such as but not limited to, Long Term Evolution (LTE) or fifth generation (5G) radio access technology or new radio (NR) access technology, and Wi-Fi or short range radios, or other communications systems. For example, certain example embodiments may generally relate to systems and/or methods for power headroom report (PHR) triggering and reporting, for instance.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may include a method that includes receiving, at a user equipment, a configuration for at least two uplink channel pathloss references for uplink channel transmission comprising at least one repetition over at least two uplink paths in a cell. In an embodiment, the method may also include receiving, by the user equipment, of an indication from a network node of which of the configured uplink channel pathloss references or SRS resource set or SRS resource indicator (SRI) to use for triggering a power headroom report (PHR). Additionally or alternatively, the method may also include, when one power headroom report (PHR) is triggered from one of the at least two uplink channel pathloss references, indicating to a network node an association between a power headroom value and the related pathloss reference. Additionally or alternatively, the method may also include, when two power headroom reports (PHRs) are triggered from the at least two uplink channel pathloss references, indicating to the network node at least one of: two power headroom information in the uplink channel transmission with one power headroom value and power headroom value differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may include a method that includes indicating, to a user equipment, a configuration for at least two uplink channel pathloss references for uplink channel transmission comprising at least one repetition over at least two uplink paths in a cell. In an embodiment, the method may also include providing, to the user equipment, an indication of which pathloss reference or SRS resource set or SRS resource indicator (SRI) to use for the power headroom report (PHR) triggering mechanism. Additionally or alternatively, the method may also include, when one power headroom report (PHR) is triggered from one of the at least two uplink channel pathloss references, receiving from the user equipment an association between a power headroom value and the related pathloss reference. Additionally or alternatively, the method may also include, when two power headroom reports (PHRs) are triggered from the at least two uplink channel pathloss references, receiving an indication from the user equipment of at least one of: two power headroom information in the uplink channel transmission with one power headroom value and power headroom values differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may include an apparatus that includes at least one processor and at least one memory comprising computer program code. The at least one memory and computer program code may be configured, with the at least one processor, to cause the apparatus at least to receive a configuration for at least two uplink channel pathloss references for uplink channel transmission comprising at least one repetition over at least two uplink paths in a cell. In an embodiment, the at least one memory and computer program code may be configured, with the at least one processor, to cause the apparatus at least to receive an indication from a network node of which of the configured uplink channel pathloss references or SRS resource set or SRS resource indicator (SRI) to use for triggering a power headroom report (PHR). Additionally or alternatively, the at least one memory and computer program code may be configured, with the at least one processor, to cause the apparatus at least to, when one power headroom report (PHR) is triggered from one of the at least two uplink channel pathloss references, indicate to a network node an association between a power headroom value and the related pathloss reference. Additionally or alternatively, the at least one memory and computer program code may be configured, with the at least one processor, to cause the apparatus at least to, when two power headroom reports (PHRs) are triggered from the at least two uplink channel pathloss references, indicate to the network node at least one of: two power headroom information in the uplink channel transmission with one power headroom value and power headroom value differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may include an apparatus that includes at least one processor and at least one memory comprising computer program code. The at least one memory and computer program code may be configured, with the at least one processor, to cause the apparatus at least to indicate, to a user equipment, a configuration for at least two uplink channel pathloss references for uplink channel transmission comprising at least one repetition over at least two uplink paths in a cell. In an embodiment, the at least one memory and computer program code may be configured, with the at least one processor, to cause the apparatus at least to provide, to the user equipment, an indication of which pathloss reference or SRS resource set or SRS resource indicator (SRI) to use for the power headroom report (PHR) triggering mechanism. Additionally or alternatively, the at least one memory and computer program code may be configured, with the at least one processor, to cause the apparatus at least to, when one power headroom report (PHR) is triggered from one of the at least two uplink channel pathloss references, receive from the user equipment an association between a power headroom value and the related pathloss reference. Additionally or alternatively, the at least one memory and computer program code may be configured, with the at least one processor, to cause the apparatus at least to, when two power headroom reports (PHRs) are triggered from the at least two uplink channel pathloss references, receive an indication from the user equipment of at least one of: two power headroom information in the uplink channel transmission with one power headroom value and power headroom values differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may include an apparatus including means for receiving a configuration for at least two uplink channel pathloss references for uplink channel transmission comprising at least one repetition over at least two uplink paths in a cell. In an embodiment, the apparatus may include means for receiving an indication from a network node of which of the configured uplink channel pathloss references or SRS resource set or SRS resource indicator (SRI) to use for triggering a power headroom report (PHR). Additionally or alternatively, the apparatus may include, when one power headroom report (PHR) is triggered from one of the at least two uplink channel pathloss references, means for indicating to a network node an association between a power headroom value and the related pathloss reference. Additionally or alternatively, the apparatus may include, when two power headroom reports (PHRs) are triggered from the at least two uplink channel pathloss references, means for indicating to the network node at least one of: two power headroom information in the uplink channel transmission with one power headroom value and power headroom value differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may include an apparatus including means for indicating, to a user equipment, a configuration for at least two uplink channel pathloss references for uplink channel transmission comprising at least one repetition over at least two uplink paths in a cell. In an embodiment, the apparatus may include means for providing, to the user equipment, an indication of which pathloss reference or SRS resource set or SRS resource indicator (SRI) to use for the power headroom report (PHR) triggering mechanism. Additionally or alternatively, the apparatus may include, when one power headroom report (PHR) is triggered from one of the at least two uplink channel pathloss references, means for receiving from the user equipment an association between a power headroom value and the related pathloss reference. Additionally or alternatively, the apparatus may include, when two power headroom reports (PHRs) are triggered from the at least two uplink channel pathloss references, means for receiving an indication from the user equipment of at least one of: two power headroom information in the uplink channel transmission with one power headroom value and power headroom values differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may include a computer readable medium comprising program instructions stored thereon for performing at least the following method: receiving a configuration for at least two uplink channel pathloss references for uplink channel transmission comprising at least one repetition over at least two uplink paths in a cell. In an embodiment, the method may also include receiving of an indication from a network node of which of the configured uplink channel pathloss references or SRS resource set or SRS resource indicator (SRI) to use for triggering a power headroom report (PHR). Additionally or alternatively, the method may also include, when one power headroom report (PHR) is triggered from one of the at least two uplink channel pathloss references, indicating to a network node an association between a power headroom value and the related pathloss reference. Additionally or alternatively, the method may also include, when two power headroom reports (PHRs) are triggered from the at least two uplink channel pathloss references, indicating to the network node at least one of: two power headroom information in the uplink channel transmission with one power headroom value and power headroom value differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may include a computer readable medium comprising program instructions stored thereon for performing at least the following method: indicating, to a user equipment, a configuration for at least two uplink channel pathloss references for uplink channel transmission comprising at least one repetition over at least two uplink paths in a cell. In an embodiment, the method may also include providing, to the user equipment, an indication of which pathloss reference or SRS resource set or SRS resource indicator (SRI) to use for the power headroom report (PHR) triggering mechanism. Additionally or alternatively, the method may also include, when one power headroom report (PHR) is triggered from one of the at least two uplink channel pathloss references, receiving from the user equipment an association between a power headroom value and the related pathloss reference. Additionally or alternatively, the method may also include, when two power headroom reports (PHRs) are triggered from the at least two uplink channel pathloss references, receiving an indication from the user equipment of at least one of: two power headroom information in the uplink channel transmission with one power headroom value and power headroom values differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

BRIEF DESCRIPTION OF THE DRAWINGS

For proper understanding of example embodiments, reference should be made to the accompanying drawings, wherein.

DETAILED DESCRIPTION

Figure 1:
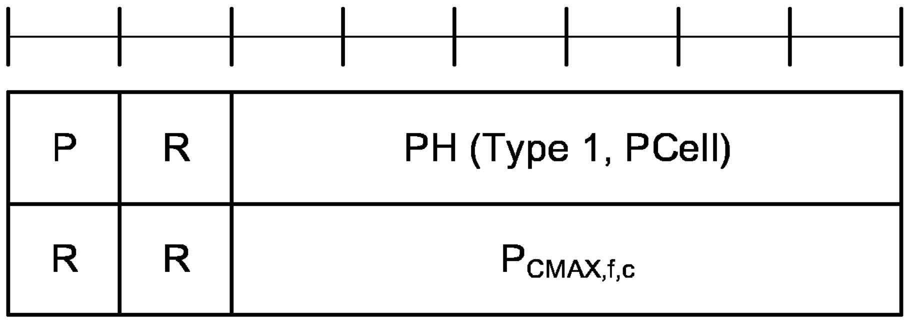
FIG. 1 illustrates an example of the single cell type-1 PHR medium access control (MAC) control element (CE) format, according to one example.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for PHR triggering and reporting, e.g., for multiple transmission-reception point (multi-TRP) physical uplink shared channel (PUSCH) repetition operation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Enhancements are currently being considered for multi-TRP/panel transmission including for frequency range 1 (FR1) and frequency range 2 (FR2). Such enhancements for the support of multi-TRP deployment may include identifying and specifying features to improve the reliability and robustness for channels other than physical downlink shared channel (PDSCH), such as physical downlink control channel (PDCCH), physical uplink shared channel (PUSCH) and physical uplink control channel (PUCCH) using multi-TRP and/or multi-panel, with Release-16 reliability features as the baseline.

For multi-TRP/panel PUSCH enhancement, consideration is being given to a scheme for UE transmitting PUSCH repetition over multi-TRP to enhance the uplink (UL) reliability and robustness. For example, to support single downlink control information (DCI) based M-TRP PUSCH repetition schemes (i.e. operation), up to two beams may be supported.

With the support for multi-TRP PUSCH repetition operation, a transport block is repeated (in a TDM-ed manner)

towards different TRPs, and up to two sounding reference signal (SRS) resource indicators (SRIs) may be indicated (or at least determined) in that case. It should be noted that an SRI may also refer to an uplink (UL) path, UL beam, UL transmission configuration indicator (TCI) state, joint TCI state, common TCI state, spatial filter, spatial relation information, a TRP link (or simply TRP), etc. In other words, as described herein, these terms may be used interchangeably. It is also noted that there may be an association between an SRS resource set and a TRP (or an uplink path), where the pathloss reference RS, or simply pathloss reference, and SRS resources of this SRS resource set are also associated to this TRP (or this uplink path). It is also noted that the SRI (which is the indicator of an SRS resource belonging to a SRS resource set) may be mapped or associated to a set of PUSCH power control parameters including the pathloss reference RS, or simply pathloss reference, where this association may be done using at least sri-PUSCH-MappingToAddModList as described e.g. in TS 38.331 and TS 38.213.

There are two PUSCH repetition types defined in the current specifications (e.g. 3GPP TS 38.214), namely PUSCH repetition Type A and PUSCH repetition Type B. The PUSCH repetition Type A, refers to inter-slot PUSCH repetition operation defined in Release-15. The PUSCH repetition Type B, which was introduced in Release-16, essentially allows, for a transport block, one dynamic UL grant or one configured grant to schedule one, two or more PUSCH repetitions that can be in one slot, or across slot boundary in consecutive available slots. It should be noted that, for PUSCH repetition Type B, one nominal repetition can be segmented into one or more actual repetitions (around semi-static DL symbols and dynamically indicated/semi-statically configured invalid UL symbols and/or at the slot boundary). So, the term PUSCH repetition may refer to actual repetition in case of PUSCH Type B.

Furthermore, consideration is being given to the issue of the impact of PUSCH repetition over multi-TRP/panels on the current PHR scheme. In the current PHR framework, a PHR may be triggered if phr-ProhibitTimer expires or has expired and the path loss has changed more than phr-Tx-PowerFactorChange dB for at least one activated serving cell of any medium access control (MAC) entity of which the active downlink (DL) bandwidth part (BWP) is not dormant BWP which is used as a pathloss reference since the last transmission of a PHR in this MAC entity when the MAC entity has UL resources for new transmission. Additionally or alternatively, in the current PHR framework, a PHR may be triggered if phr-PeriodicTimer expires or upon configuration or reconfiguration of the power headroom reporting functionality by upper layers, which is not used to disable the function.

With respect to PHR for PUSCH, i.e., type 1 PHR, FIG. 1 illustrates an example of the single cell type-1 PHR MAC control element (CE) format (e.g., see 3GPP TS 38.321). The dependency between the reported type-1 power headroom (PH) value and the PUSCH pathloss reference may be given as (e.g., see 3GPP TS 38.213):

$$PH_{type1,b,f,c}(i,j,q_d,l) = P_{CMAX,f,c}(i) - \{P_{O\_PUSCH,b,f,c}(j) + 10\log_{10}(2^{\mu}\cdot M_{RB,b,f,c}^{PUSCH}(i)) + \alpha_{b,f,c}(j)\cdot PL_{b,f,c}(q_d) + \Delta_{TF,b,f,c}(i) + f_{b,f,c}(i,l)\}$$

where the $PL_{b,f,c}$ ($q_d$) is the DL reference pathloss estimated in dB and the DL pathloss reference is associated with the pusch-PathlossReferenceRS-Id. The pusch-PathlossReferenceRS-Id is either included in SRI-PUSCH-PowerControl which is indicated through mapping the SRI in DCI to sri-PUSCH-PowerControlId, or is mapped to value zero pusch-PathlossReferenceRS-Id when no SRI is presented in DCI or SRI-PUSCH-PowerControl is not configured.

In the current one cell single entry PHR MAC CE illustrated in FIG. 1, the PHR MAC CE does not indicate the linking between the reported type 1 PH value and the associated path loss reference. This is due to the fact that, based on the existing operation, just one path loss reference is indicated and/or configured for a given PUSCH transmission/repetition instance for one cell. This is because existing specifications have only thus far considered the single-TRP (or equivalently, single UL beam) PUSCH transmission/repetition case.

However, as outlined above, multi-TRP PUSCH repetition operation is currently being standardized in Release-17 NR, where the same transport block can be repeated on PUSCH using different UL beams (i.e., towards different TRPs). Since, under this operation, there could be different power control parameters associated with different UL beams, including path loss reference (more precisely, path loss reference signal (RS)), there are some unresolved issues that need to be addressed regarding the PHR triggering and indication.

Specifically, if two PUSCH path loss references are indicated/configured for the UE for PUSCH repetition over two UL beams in one cell, there are currently no specific rules or schemes for (i) how the PHR is triggered for two indicated PUSCH path loss references, and/or (ii) how the PHR is associated with one of the indicated PUSCH path loss reference (mainly for the case of single PHR MAC CE used). In addition, it is currently not clear how to allow the network and UE to have a common understanding regarding the PHR triggering and reporting mechanisms, considering the cases of a single PHR or two PHRs reporting possibilities. As will be discussed in detail in the following, certain example embodiments can provide solutions to address and overcome at least the issues described above, in addition to other problems not discussed herein.

According to some example embodiments, two type-1 PHR may be triggered independently according to multiple indicated (or configured) PUSCH pathloss references. In an embodiment, for one PHR triggered from one of the indicated PUSCH pathloss references, in single entry PHR MAC CE, the association between the PH value and the related pathloss reference may be indicated through the reserved bits (which are otherwise defined for the legacy interpretation). Alternatively, this association may be indicated using new entries, fields, and/or bits in the MAC CE.

According to certain embodiments, for two PHRs which are triggered from two indicated (or configured) PUSCH pathloss references, at least one of the following may apply: one single entry PHR MAC CE with one PH value and PH value differentiation information (differential PH) may be used to indicate two PH information/values in one PUSCH transmission, two single entry PHR MAC CE can be used to indicate two PH values in one PUSCH (or TB) transmission (including one or multiple PUSCH repetitions), or one single entry PHR MAC CE may be used to indicate one PH value in one PUSCH transmission and the other PH value may be carried with single entry PHR MAC-CE via another PUSCH transmission(s), for example.

According to an embodiment, in multi-TRP PUSCH repetition operation in one cell, where two PUSCH pathloss references are indicated and/or configured (corresponding to two SRS sets or SRS resource indicators (SRI) or TRPs), the above may be applied as discussed below with further considerations.

According to one embodiment, a single PHR can be triggered. In this case, the UE may determine which pathloss reference to use for the PHR triggering mechanism (at MAC) based on a configured rule and/or indication from the network. And, when the PHR is triggered (and there are available UL resources to carry it), the UE may indicate the determined pathloss reference or its corresponding SRS resource set or SRI, e.g., using 1-bit field in MAC CE. In some embodiments, the UE may be configured to use the pathloss reference corresponding or associated to the SRI (i.e., UL beam or TRP or uplink path) indicated in the first (or second) SRI field. Alternatively or additionally, the UE may be configured to use the pathloss reference corresponding or associated to the SRI corresponding to one of the SRS resource sets (e.g., SRS resource set with lowest index). In an embodiment, the UE may be indicated, by the network (e.g. via MAC CE), which pathloss reference or SRS resource set or SRI to consider for the PHR triggering mechanism. For example, the indication by the network can be sent via DL MAC CE or via DCI (in PDCCH), by either using a dedicated field or by leveraging an existing field(s) (or reserved entries/bits), such as the SRI field(s), the 'Precoding information and number of layers' (or transmitted precoding matrix indicator (TPMI)) field(s), etc. The UE may use the determined pathloss reference and/or the other power control parameters, belonging to the same set of power control parameters associated to the corresponding SRS resource set or SRI, for the PHR calculation. When the UE is provided indication from the network or configured which pathloss reference to use, the UE may not send an indication regarding the pathloss reference or SRS resource set or SRI corresponding to the selected PHR.

According to a further embodiment, two PHRs can be triggered and just a single PHR can be reported at a time. If both PHRs are triggered, the UE may select which PHR to report towards the network based on a configured rule and/or indication from the network. The UE may also indicate the pathloss reference or SRS resource set or SRI (i.e. UL beam or TRP or uplink path) corresponding the selected PHR. In one example, the rule may include selecting the smaller (or larger) PHR value between the two PHR values. For example, if both PHR values are positive, then the rule may cause the UE to report the smaller value; if one PHR value is positive and one PHR is negative, then the rule may cause the UE to report the negative value; if both PHR values are negative, then the rule may cause the UE to report the largest absolute value. The indication by the UE of the pathloss reference or SRS resource set or SRI corresponding to the selected PHR can be carried, e.g., via (UL) MAC CE carrying the selected PHR (e.g., using at least one reserved bit). According to one example, the indication from the network may be used to convey to the UE which SRS resource set or UL beam or pathloss reference to consider, and the UE may select the PHR corresponding to the indicated SRS resource set or SRI or pathloss reference; it is noted that the options or examples provided for other embodiments regarding the indication from the network may also apply here. According to one example, the UE may be configured to use the pathloss reference corresponding or associated to the SRI corresponding to one of the SRS resource sets (e.g., SRS resource set with lowest index). When the UE is provided indication from the network or configured which pathloss reference to use, the UE may not send an indication regarding the pathloss reference or SRS resource set or SRI corresponding to the selected PHR as there may not be a selection by the UE as such (e.g. since the network indicates which pathloss reference or SRS resource set or SRI the UE should consider).

According to a further embodiment, where two PHRs can be triggered and just a single PHR can be reported at a time, but just one PHR is triggered, then the UE may indicate the pathloss reference or SRS resource set or SRI corresponding to the triggered PHR (e.g. using 1-bit field or reserved bit in MAC CE); in addition to the PHR value.

According to a further embodiment, two PHRs can be triggered and two PHRs can be reported at a time, and one or both PHRs may be triggered. In this case, if both PHRs are triggered, then the UE may indicate that both PHRs are triggered and that information related to two PHRs (as described below) is reported (e.g., in MAC CE). For example, this indication can be carried via 1-bit (e.g., reserved bit) in MAC CE. The UE may select a first PHR. For instance, the UE may select which PHR to report based on a configured rule and/or indication from the network. The rule and/or indication may be configured as discussed in detail above. The UE may indicate the SRS resource set or SRI or pathloss reference corresponding to the selected PHR, e.g., using 1-bit (e.g., reserved bit) in MAC CE. The UE may calculate a differential value representing the difference between the selected PHR and the other PHR. For the calculation of the differential value, a set/list of values may be configured, the UE may calculate the difference between the two PHRs, and the UE may select the value (from the configured set) that is closest to the calculated difference. For example, two bits may be used to carry the differential value, in which case a set of (up to) 4 values may configured. The selected PHR, the UE indication, and the differential value, may be sent together via, e.g., (UL) MAC CE. In a variant, the UE may just report the two PHRs in one or multiple PUSCH transmissions.

In an embodiment, where two PHRs can be triggered, two PHRs can be reported at a time, and one or both PHRs may be triggered, if a single PHR is triggered, then the UE may indicate that a single PHR is triggered and thus one PHR is reported (e.g. in MAC CE); this indication can be carried, e.g., via 1-bit in MAC CE. The UE may indicate the pathloss reference or SRS resource set or SRI corresponding to the triggered PHR. It should be noted that, in certain embodiments, the term 'pathloss reference' may refer to pathloss reference RS (or simply, pathloss RS).

According to certain embodiments, in cases where just one PHR will be reported, the UE may transmit a single entry PHR MAC CE on an actual PUSCH transmission. The reserved bits in the single entry PHR MAC CE (marked "R" in FIG. 1) can be used to differentiate different pathloss reference/SRS resource set/SRI. For example, if two PUSCH pathloss references are configured in the UE, the PHR for the first pathloss reference is indicated if the reserved bit is set to 0 and the PHR for the second pathloss reference is indicated if that reserved bit is set to 1.

According to some embodiments, in cases where two PHRs will be reported, different alternatives may be provided for one or two PHR reports. In one alternative, one single entry PHR MAC CE can be used to report two PH values in one PUSCH transmission using one reserved bit to indicate one pathloss references/SRS resource sets/SRI, and the other two reserved bits may be used to indicated the PH value difference between the non-indicated pathloss reference/SRS resource set/SRI and the indicated pathloss reference/SRS resource set/SRI. For example, four levels of PH value difference can be mapped to two reserved bits and the values can be pre-configured by the network, e.g., through RRC.

Figure 2:
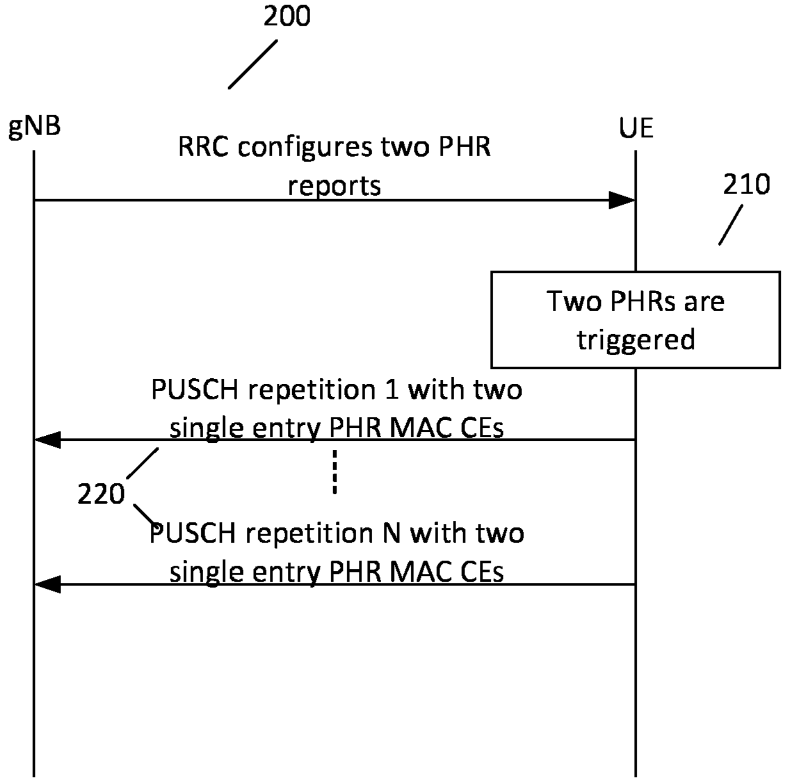
FIG. 2 illustrates an example signaling diagram, according to one embodiment.

FIG. 2 illustrates a signaling diagram depicting another alternative for two PHR in multi-TRP PUSCH transmission (including multiple PUSCH repetitions), according to one embodiment. As illustrated in the example of FIG. 2, at 200, a gNB may configure two PHR reports to the UE, e.g., via RRC. At 210, the UE may trigger two PHRs. As further illustrated in the example of FIG. 2, at 220, two single entry PHR MAC CE with pathloss reference/SRS resource set/SRI indication in reserved bits may be transmitted in one PUSCH transmission. In the example of FIG. 2, the PUSCH transmission 220 may be repeated N times; i.e. the PUSCH transmission may be consisting of N PUSCH repetitions. Each single entry PHR MAC CE may indicate one PH values for the associated pathloss reference/SRS resource set/SRI. The order of the two PHR can be, for instance, configured by the network (e.g. by the gNB through RRC), then the reserved bit from the PHR MAC CE may or may not be used for indication.

Figures 3, 4:
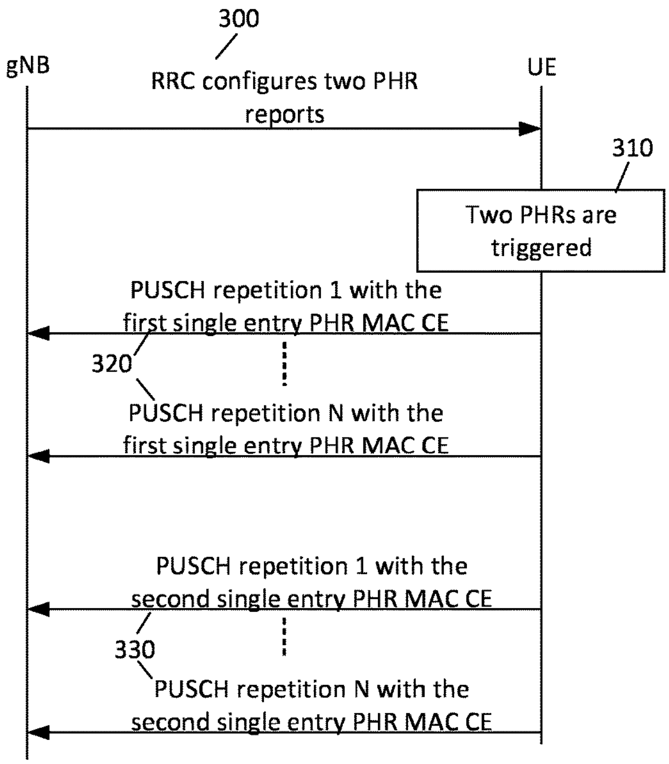
FIG. 3 illustrates an example signaling diagram, according to one embodiment.
FIG. 4 illustrates an example PHR-Config information element (IE), according to one example.

FIG. 3 illustrates an example signaling diagram depicting an alternative for two PHRs in two multi-TRP PUSCH transmissions, according to an embodiment. As illustrated in the example of FIG. 3, at 300, a gNB may configure two PHR reports to the UE, e.g., via RRC. At 310, the UE may trigger two PHRs. As also illustrated in the example of FIG. 3, at 320, the UE may report a PHR for the pathloss reference/SRS resource set/SRI with, for example, the lowest ID on the first PUSCH transmission and, at 330, may report the other PHR for pathloss reference/SRS resource set/SRI with the second lowest ID on the second PUSCH transmission. As illustrated in the example of FIG. 3, the PUSCH transmission 320 and/or PUSCH transmission 330 may be repeated N times. The mapping between PHR order and the PUSCH transmission can be configured by the network (e.g., gNB) through RRC. For each type 1 PHR on a PUSCH transmission, a single entry PHR MAC CE may be used and the reserved bit from the PHR MAC CE may or may not be used for indication.

For the UE indicated with two PUSCH pathloss references/SRS resource sets/SRI, different alternatives for PHR triggering can be considered. In the case where just one PHR can be triggered, one set of PHR parameters in PHR-Config and the legacy PHR triggering mechanism may be applied. FIG. 4 illustrates an example PHR-Config information element (IE), according to one example.

In the case where two PHRs can be triggered, one set of PHR parameter PHR-Config may be configured in the UE or two sets of PHR parameter PHR-Config may be configured in the UE. When one set are configured, the parameters in the one configured PHR-Config may be applied for the PHR triggering conditions and, for example, if any pathloss reference/SRS resource set/SRI satisfies PHR triggering conditions, the PHR may be triggered. When two sets of PHR parameter PHR-Config are configured in the UE, there may be two sets of PHR triggering conditions. Each set of PHR triggering conditions may be associated with one (independent) pathloss reference/SRS resource set/SRI and the set of PHR triggering conditions may be based on one independent PHR-Config parameters. A PHR(s) may be triggered, for example, if any set of triggering conditions are satisfied.

Figure 5A:
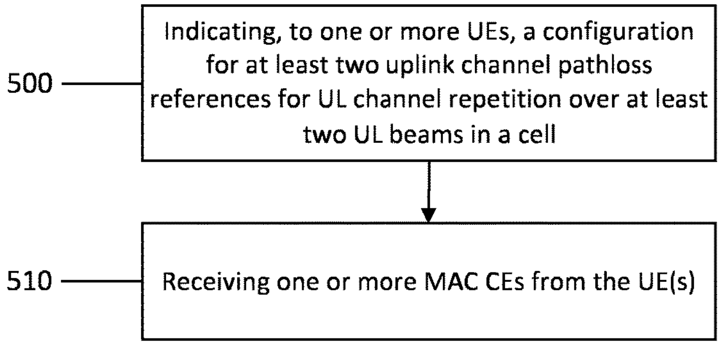
FIG. 5A illustrates an example flow diagram of a method, according to an embodiment.

FIG. 5A illustrates an example flow diagram of a method for PHR triggering and reporting, e.g., for multi-TRP PUSCH repetition operation, according to an example embodiment. In certain example embodiments, the flow diagram of FIG. 5A may be performed by a network entity or network node in a communications system, such as LTE or 5G NR. In some example embodiments, the network entity performing the method of FIG. 5A may include or be included in a base station, access node, node B, eNB, gNB, NG-RAN node, TRPs, high altitude platform stations (HAPS), relay station or the like. In one embodiment, the network node performing the method of FIG. 5A may include a gNB or similar radio node.

As illustrated in the example of FIG. 5A, the method may include, at 500, indicating, to one or more UEs, a configuration for at least two uplink channel (e.g., PUSCH) pathloss references for UL channel repetition over at least two UL beams (or SRIs or uplink paths or TRPs) in a cell. In some embodiments, the method may include, at 510, receiving one or more MAC CEs from the UE(s). For example, when one PHR is triggered from one of the at least two UL channel pathloss references, the receiving 510 may include receiving from the UE an association between a power headroom value and the related pathloss reference in reserved bits in a single entry MAC CE. As another example, when two PHRs are triggered from the at least two UL channel pathloss references, the receiving 510 may include receiving an indication from the user equipment of at least one of: two power headroom information in an UL channel transmission using a single entry MAC CE with one power headroom value and power headroom value differentiation information, or two power headroom values in an UL channel transmission using two single entry MAC CEs, or one power headroom value in an UL channel transmission using a single entry MAC CE, where one or more other power headroom values may be carried using single entry MAC CE via one or more other UL channel transmission(s).

According to certain embodiments, when a single PHR can be triggered from one of the at least two uplink channel pathloss references and when the PHR is triggered, the receiving 510 may include receiving the determined pathloss reference or its corresponding SRS resource set or SRI, for example, using a 1-bit field in the MAC CE. In some embodiments, the indicating 500 may include configuring the UE to use at least one of: the pathloss reference corresponding or associated to the SRI indicated in the first or second SRI field, or to use the pathloss reference corresponding or associated to the SRI corresponding to one of the SRS resource sets. According to an embodiment, the indicating 500 may further include providing, to the UE, an indication of which pathloss reference or SRS resource set or SRI to use for the PHR triggering mechanism.

According to certain embodiments, when two PHRs can be triggered (or are allowed/available to be triggered) and a single PHR can be reported (or allowed to be reported) at a time, and when both of the PHRs are triggered, the method may include configuring a rule or providing an indication, to the UE, for which one of the PHRs to report, and the receiving 510 may include receiving, from the UE, an indication of at least one of the pathloss reference or SRS resource set or SRI (e.g., UL beam) corresponding to a PHR selected by the UE. In some embodiments, the rule may include selecting one of a smaller or larger PHR value between the two PHRs values. As an example, if both PHR values are positive then the UE may be configured to report the smaller value, if one PHR value is positive and one is negative then the UE may be configured to report the negative value, and/or if both PHR values are negative then the UE may be configured to report the largest absolute value. According to some embodiments, the receiving 510 may include receiving the pathloss reference or SRS resource set or SRI corresponding to the PHR selected by the UE, in an UL MAC CE carrying the selected PHR.

According to certain embodiments, when two PHRs can be triggered (or are allowed/available to be triggered) and a single PHR can be reported (or allowed to be reported) at a time, and when only one PHR is triggered, the receiving 510 may include receiving, from the UE, the pathloss reference or SRS resource set or SRI corresponding to the triggered PHR along with the PHR value.

According to certain embodiments, when two PHRs can be triggered and two PHRs can be reported at a time, and when both PHRs are triggered, the receiving 510 may include receiving, from the UE, an indication that both PHRs are triggered and that information related to two PHRs are reported. In some embodiments, the method may include configuring a rule or providing an indication, to the UE, for a first PHR to report, and receiving the SRS resource set or SRI or pathloss reference corresponding to the PHR selected by the UE. According to an embodiment, the receiving 510 may include receiving at least one of the selected PHR or the differential value representing a difference between the selected PHR and the other of the two PHR, e.g., in an UL MAC CE. In some embodiments, the method may include receiving the two PHRs in one or multiple PUSCH transmissions.

According to certain embodiments, when two PHRs can be triggered and two PHRs can be reported at a time, and when one PHR is triggered, the receiving 510 may include receiving that a single power headroom report (PHR) is triggered and that one power headroom report (PHR) is reported. In an embodiment, the receiving 510 may further include receiving at least one of the pathloss reference or SRS resource set or SRI corresponding to the triggered PHR.

Figure 5B:
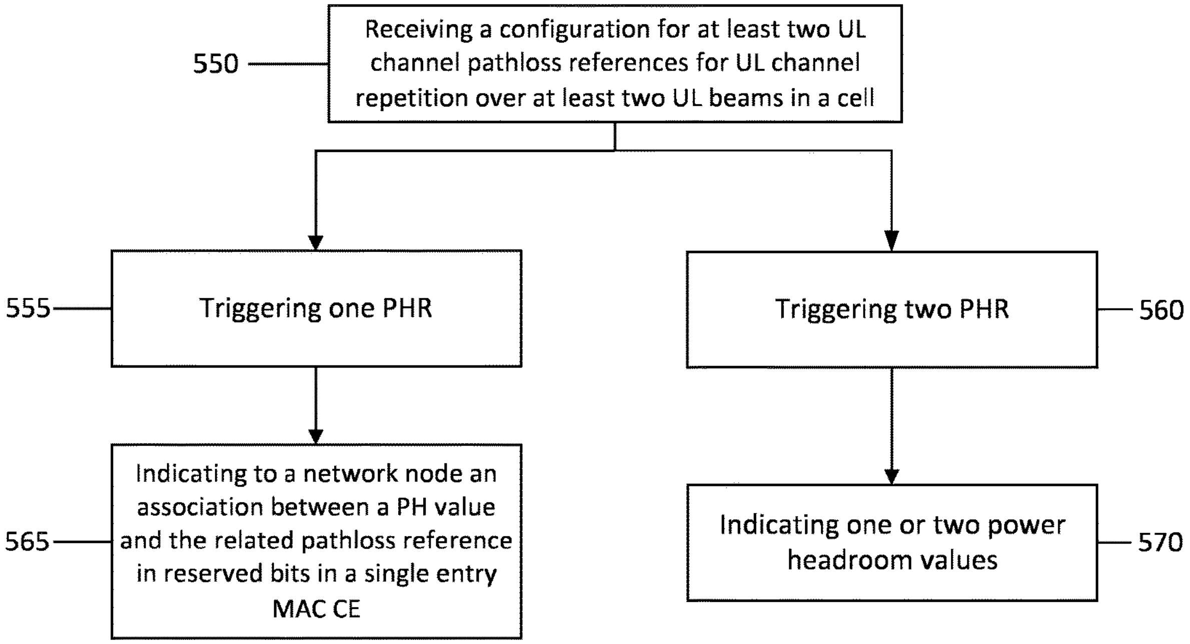
FIG. 5B illustrates an example flow diagram of a method, according to an embodiment.

FIG. 5B illustrates an example flow diagram of a method for PHR triggering and reporting, e.g., for multi-TRP PUSCH repetition operation, according to one embodiment. In certain example embodiments, the flow diagram of FIG. 5B may be performed by a network entity or network node in a communications system, such as LTE or 5G NR. In some example embodiments, the network entity performing the method of FIG. 5B may include or be included in UE, communication node, mobile equipment (ME), mobile station, mobile device, stationary device, IoT device, or other device.

As illustrated in the example of FIG. 5B, the method may include, at 550, receiving a configuration for at least two UL channel (e.g., PUSCH) pathloss references for UL channel repetition over at least two UL beams (or SRIs) in a cell. In an embodiment, the method may include, at 555, triggering one PHR. According to an embodiment, when one PHR is triggered from one of the at least two UL channel pathloss references, the method may include, at 565, indicating to a network node an association between a power headroom value and the related pathloss reference in reserved bits in a single entry MAC CE.

In an embodiment, the method may include, at 560, triggering two PHRs. According to an embodiment, when two PHRs are triggered from the at least two UL channel pathloss references, the method may include, at 570, indicating to the network node at least one of: two power headroom information in an UL channel transmission using a single entry MAC CE with one power headroom value and power headroom value differentiation information, or two power headroom values in an UL channel transmission using two single entry MAC CEs, or one power headroom value in an UL channel transmission using a single entry MAC CE, where one or more other power headroom values may be carried using single entry MAC CE via one or more other UL channel transmissions.

According to certain embodiments, when a single PHR can be triggered from one of the at least two UL channel pathloss references, the method may include determining which one of the pathloss references to use for the PHR triggering based on a configured rule and/or indication from the network node. In an embodiment, when the single PHR is triggered, the indicating 565 may include indicating the determined pathloss reference or its corresponding SRS resource set or SRI, for example, using a 1-bit field in the MAC CE. In some embodiments, the method may include receiving a configuration to use at least one of: the pathloss reference corresponding or associated to the SRI indicated in the first or second SRI field, or the pathloss reference corresponding or associated to the SRI corresponding to one of the SRS resource sets. In an embodiment, the receiving 550 may include receiving an indication from the network node of which pathloss reference or SRS resource set or SRI to use for the PHR triggering mechanism. According to some embodiments, the method may include calculating the PHR using at least one of the determined pathloss reference and/or other power control parameters belonging to a same set of power control parameters associated to the corresponding SRS resource set or SRI.

According to certain embodiments, when two PHRs can be triggered (or are allowed to be triggered) and a single PHR can be reported (or is allowed to be reported) at a time, and when both of the PHRs are triggered, the method may include selecting which one of the PHRs to report towards the network based on at least one of a configured rule or indication from the network node. In an embodiment, the indicating 570 may include indicating, to the network node, at least one of the pathloss reference or SRS resource set or SRI corresponding the selected PHR. In some embodiments, the rule may include selecting one of a smaller or larger PHR value between the two PHRs values. In one embodiment, the indication from the network node may include an indication of which SRS resource set or UL beam or pathloss reference the UE should consider, and the method may further include selecting, by the UE, the PHR corresponding to at least one of the indicated SRS resource set or SRI or pathloss reference. According to an embodiment, the indicating 570 may include indicating the pathloss reference or SRS resource set or SRI corresponding to the selected PHR in an UL MAC CE carrying the selected PHR.

According to certain embodiments, when two PHRs can be triggered (or are allowed to be triggered) and a single PHR can be reported (or is allowed to be reported) at a time, and when only one PHR is triggered, the indicating 570 may include indicating the pathloss reference or SRS resource set or SRI corresponding to the triggered PHR along with the PHR value.

According to certain embodiments, when two PHRs can be triggered (or allowed to be triggered) and two PHRs can be reported (or are allowed to be reported) at a time, and when both PHRs are triggered, the indicating 570 may include indicating that both PHRs are triggered and that information related to two PHRs are reported. In an embodiment, the method may include selecting, by the UE, a first PHR to report based on at least one of a configured rule or indication from the network node, and indicating the SRS resource set or SRS resource indicator (SRI) or pathloss reference corresponding to the selected power headroom report (PHR). According to one embodiment, the method may include calculating a differential value representing a difference between the selected PHR and the other of the two PHRs. In an embodiment, the method may include sending at least one of the selected PHR, the indication from the UE, or the differential value, in an UL MAC CE. According to an embodiment, the method may include reporting the two PHRs in one or multiple PUSCH transmissions.

According to certain embodiments, when two PHRs can be triggered (or are allowed/available to be triggered) and two PHRs can be reported at a time, and when one PHR is triggered, the indicating 570 may include indicating that a single PHR is triggered and therefore one PHR is reported. In an embodiment, the indicating 570 may further include indicating at least one of the pathloss reference or SRS resource set or SRI corresponding to the triggered PHR.

Figure 6:
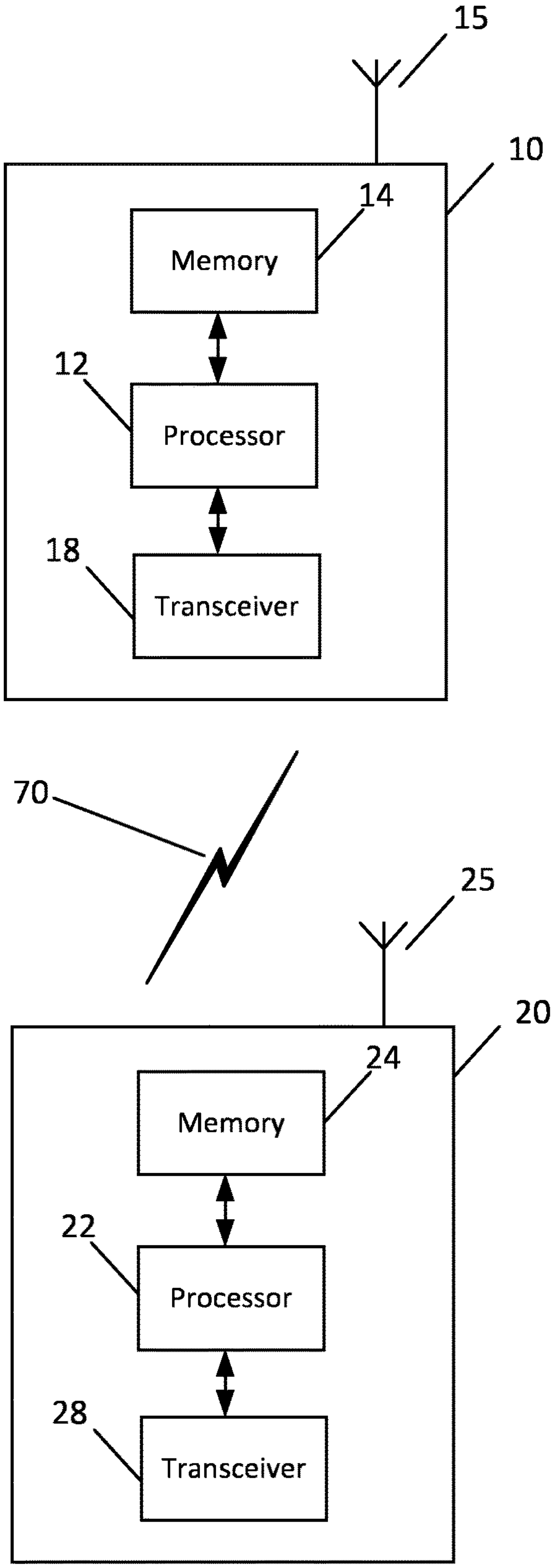
FIG. 6 illustrates an example block diagram of apparatuses, according to an embodiment.

FIG. 6 illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6.

As illustrated in the example of FIG. 6, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB or other radio node. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 2, 3, or 5A, or any other method described herein. In some embodiments, as discussed herein, apparatus 10 may be configured to perform a procedure relating to triggering and/or PHR, e.g., for multi-TRP PUSCH repetition operation, as discussed elsewhere herein, for example.

FIG. 6 illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6.

As illustrated in the example of FIG. 6, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to FIG. 2, 3, or 5B, or any other method described herein. For example, in an embodiment, apparatus 20 may be controlled to perform a process relating to triggering and/or PHR, e.g., for multi-TRP PUSCH repetition operation, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and/or management. For example, as discussed in detail above, certain embodiments provide systems and/or methods that allow the network and UE to have a common understanding regarding the PHR triggering and reporting mechanisms, considering the cases of a single PHR or two PHRs reporting possibilities, for instance. Some example embodiments may be particularly applicable and needed for the multi-TRP PUSCH repetition operation, where the UE is indicated and/or configured two pathloss references for the transmission of a transport block (TB). However, example embodiments are not just limited to such an application. Accordingly, the use of certain example embodiments results in improved functioning of communications networks and their nodes, such as base stations, eNBs, gNBs, and/or IoT devices, UEs or mobile stations.

An embodiment may be directed to a method that includes receiving, at a user equipment, a configuration for at least two uplink channel pathloss references for uplink channel transmission comprising at least one repetition over at least two uplink paths in a cell. The method may then include performing at least one of: receiving, by the user equipment, an indication from a network node of which of the configured uplink channel pathloss references or SRS resource set or SRS resource indicator (SRI) to use for triggering a power headroom report (PHR); or when one power headroom report (PHR) is triggered from one of the at least two uplink channel pathloss references, indicating to a network node an association between a power headroom value and the related pathloss reference; or when two power headroom reports (PHRs) are triggered from the at least two uplink channel pathloss references, indicating to the network node at least one of: two power headroom information in the uplink channel transmission with one power headroom value and power headroom value differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment is directed to an apparatus that may include at least one processor and at least one memory comprising computer program code. The at least one memory and computer program code configured, with the at least one processor, to cause the apparatus at least to perform: receiving a configuration for at least two uplink channel pathloss references for uplink channel transmission comprising at least one repetition over at least two uplink paths in a cell. The apparatus may then be caused to perform at least one of: receiving an indication from a network node of which of the configured uplink channel pathloss references or SRS resource set or SRS resource indicator (SRI) to use for triggering a power headroom report (PHR); or when one power headroom report (PHR) is triggered from one of the at least two uplink channel pathloss references, indicating to a network node an association between a power headroom value and the related pathloss reference; or when two power headroom reports (PHRs) are triggered from the at least two uplink channel pathloss references, indicating to the network node at least one of: two power headroom information in the uplink channel transmission with one power headroom value and power headroom value differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment is directed to an apparatus that may include means for receiving a configuration for at least two uplink channel pathloss references for uplink channel transmission comprising at least one repetition over at least two uplink paths in a cell. The apparatus may also include at least one of: means for receiving an indication from a network node of which of the configured uplink channel pathloss references or SRS resource set or SRS resource indicator (SRI) to use for triggering a power headroom report (PHR); or when one power headroom report (PHR) is triggered from one of the at least two uplink channel pathloss references, means for indicating to a network node an association between a power headroom value and the related pathloss reference; or when two power headroom reports (PHRs) are triggered from the at least two uplink channel pathloss references, means for indicating to the network node at least one of: two power headroom information in the uplink channel transmission with one power headroom value and power headroom value differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may be directed to a computer readable medium comprising program instructions stored thereon for performing a method including at least the following: receiving, at a user equipment, a configuration for at least two uplink channel pathloss references for uplink channel transmission comprising at least one repetition over at least two uplink paths in a cell. The method may then include performing at least one of: receiving, by the user equipment, an indication from a network node of which of the configured uplink channel pathloss references or SRS resource set or SRS resource indicator (SRI) to use for triggering a power headroom report (PHR); or when one power headroom report (PHR) is triggered from one of the at least two uplink channel pathloss references, indicating to a network node an association between a power headroom value and the related pathloss reference; or when two power headroom reports (PHRs) are triggered from the at least two uplink channel pathloss references, indicating to the network node at least one of: two power headroom information in the uplink channel transmission with one power headroom value and power headroom value differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment is directed to a method that may include indicating, to a user equipment, a configuration for at least two uplink channel pathloss references for uplink channel transmission comprising at least one repetition over at least two uplink paths in a cell. The method may also include performing at least one of: providing, to the user equipment, an indication of which pathloss reference or SRS resource set or SRS resource indicator (SRI) to use for the power headroom report (PHR) triggering mechanism; or when one power headroom report (PHR) is triggered from one of the at least two uplink channel pathloss references, receiving from the user equipment an association between a power headroom value and the related pathloss reference; or when two power headroom reports (PHRs) are triggered from the at least two uplink channel pathloss references, receiving an indication from the user equipment of at least one of: two power headroom information in the uplink channel transmission with one power headroom value and power headroom values differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment is directed to an apparatus that may include at least one processor and at least one memory comprising computer program code. The at least one memory and computer program code configured, with the at least one processor, to cause the apparatus at least to perform: indicating, to a user equipment, a configuration for at least two uplink channel pathloss references for uplink channel transmission comprising at least one repetition over at least two uplink paths in a cell. The apparatus may also be caused to perform at least one of: providing, to the user equipment, an indication of which pathloss reference or SRS resource set or SRS resource indicator (SRI) to use for the power headroom report (PHR) triggering mechanism; or when one power headroom report (PHR) is triggered from one of the at least two uplink channel pathloss references, receiving from the user equipment an association between a power headroom value and the related pathloss reference; or when two power headroom reports (PHRs) are triggered from the at least two uplink channel pathloss references, receiving an indication from the user equipment of at least one of: two power headroom information in the uplink channel transmission with one power headroom value and power headroom values differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment is directed to an apparatus that may include means for indicating, to a user equipment, a configuration for at least two uplink channel pathloss references for uplink channel transmission comprising at least one repetition over at least two uplink paths in a cell. The apparatus may also include at least one of: means for providing, to the user equipment, an indication of which pathloss reference or SRS resource set or SRS resource indicator (SRI) to use for the power headroom report (PHR) triggering mechanism; or when one power headroom report (PHR) is triggered from one of the at least two uplink channel pathloss references, means for receiving from the user equipment an association between a power headroom value and the related pathloss reference; or when two power headroom reports (PHRs) are triggered from the at least two uplink channel pathloss references, means for receiving an indication from the user equipment of at least one of: two power headroom information in the uplink channel transmission with one power headroom value and power headroom values differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

An embodiment may be directed to a computer readable medium comprising program instructions stored thereon for performing a method including at least the following: indicating, to a user equipment, a configuration for at least two uplink channel pathloss references for uplink channel transmission comprising at least one repetition over at least two uplink paths in a cell. The method may also include performing at least one of: providing, to the user equipment, an indication of which pathloss reference or SRS resource set or SRS resource indicator (SRI) to use for the power headroom report (PHR) triggering mechanism; or when one power headroom report (PHR) is triggered from one of the at least two uplink channel pathloss references, receiving from the user equipment an association between a power headroom value and the related pathloss reference; or when two power headroom reports (PHRs) are triggered from the at least two uplink channel pathloss references, receiving an indication from the user equipment of at least one of: two power headroom information in the uplink channel transmission with one power headroom value and power headroom values differentiation information, or two power headroom values in an uplink channel transmission using two single entry medium access control (MAC) control elements (CEs), or one power headroom value in an uplink channel transmission using a single entry medium access control (MAC) control element (CE), wherein one or more other power headroom values are carried using single entry medium access control (MAC) control element (CE) via one or more other uplink channel transmissions.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. A method, comprising:

receiving, at a user equipment, a configuration for two uplink channel pathloss references for uplink channel transmission comprising physical uplink shared channel (PUSCH) repetition over two uplink paths associated with different transmission-reception points in a cell;

receiving, by the user equipment, an indication from a network node identifying a single one of the two uplink channel pathloss references to be used by the user equipment for triggering and reporting;

triggering two power headroom reports, each power headroom report corresponding to a respective one of the two uplink channel pathloss references:

reporting only one power headroom report of the two triggered power headroom reports, the reported power headroom report corresponding to the uplink channel pathloss reference identified by the network node; and transmitting, to the network node, a single entry medium access control (MAC) control element (CE) on a PUSCH transmission that includes:

a power headroom value corresponding to the identified uplink channel pathloss reference;

an indication of the identified uplink channel pathloss reference encoded using at least one reserved bit of the single entry MAC CE; and power headroom value differentiation information representing a difference between the power headroom value corresponding to the identified uplink channel pathloss reference and a power headroom value corresponding to the other uplink channel pathloss reference, wherein the power headroom value differentiation information is encoded using reserved bits of the single entry MAC CE.

2. An apparatus, comprising:

at least one processor; and at least one memory comprising computer program code, the at least one memory and computer program code configured, with the at least one processor, to cause the apparatus at least to:

receive a configuration for two uplink channel pathloss references for uplink channel transmission comprising physical uplink shared channel (PUSCH) repetition over two uplink paths associated with different transmission-reception points in a cell;

receive an indication from a network node identifying a single one of the two uplink channel pathloss references to be used by the apparatus for triggering and reporting;

trigger two power headroom reports, each power headroom report corresponding to a respective one of the two uplink channel pathloss references;

reporting only one power headroom report of the two triggered power headroom reports, the reported power headroom report corresponding to the uplink channel pathloss reference identified by the network node; and transmit, to the network node, a single entry medium access control (MAC) control element (CE) on a PUSCH transmission that includes:

a power headroom value corresponding to the identified uplink channel pathloss reference;

an indication of the identified uplink channel pathloss reference encoded using at least one reserved bit of the single entry MAC CE; and power headroom value differentiation information representing a difference between the power headroom value corresponding to the identified uplink channel pathloss reference and a power headroom value corresponding to the other uplink channel pathloss reference, wherein the power headroom value differentiation information is encoded using reserved bits of the single entry MAC CE.

3. The apparatus of claim 2, wherein the rule comprises selecting one of a smaller or larger power headroom report value between the two power headroom reports values.

4. The apparatus of claim 3, wherein the selecting comprises:

when the two power headroom reports values are positive, selecting and reporting the smaller value from the positive values;

when one of the two power headroom reports values is positive and one is negative, selecting and reporting the negative value; or when the two power headroom reports values are negative, selecting and reporting the largest absolute value from the negative values.

5. The apparatus of claim 4, wherein the indicating comprises indicating the pathloss reference or SRS resource set or SRS resource indicator corresponding to the selected power headroom report in an uplink MAC CE carrying the selected power headroom report.

* * * * *